United States Patent Office 3,363,770
Patented Jan. 16, 1968

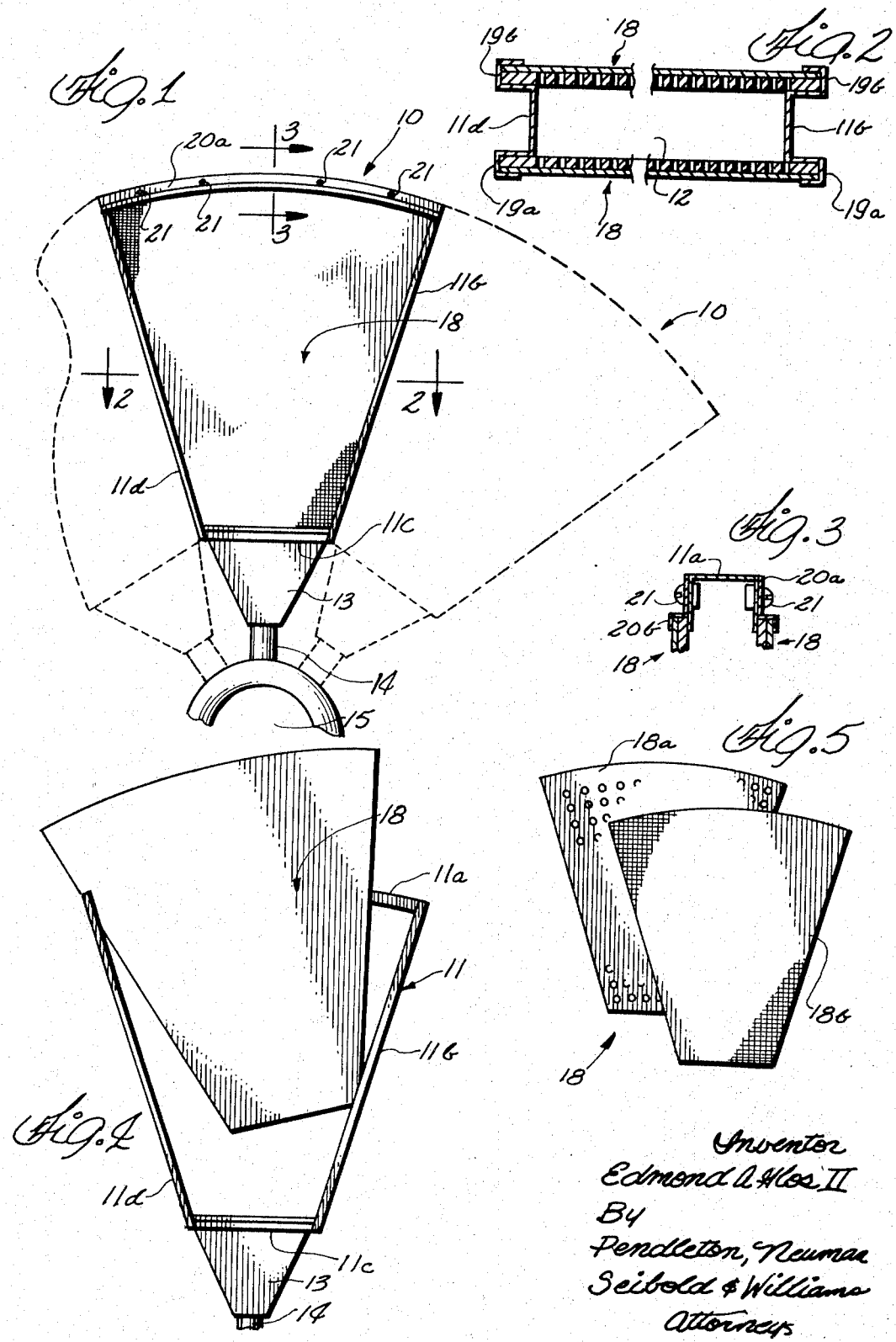

3,363,770
FILTER APPARATUS
Edmond A. Glos II, Deerfield, Ill., assignor to Mero & Company, Inc., Chicago, Ill., a corporation of Illinois
Filed Oct. 5, 1964, Ser. No. 401,386
3 Claims. (Cl. 210—345)

ABSTRACT OF THE DISCLOSURE

A polygonal filter compartment having channels in the sides thereof for slidable reception of filter plates. The plates being removably retained within the channels by a fastening means at one end of the compartment.

The present invention relates to filtering apparatus and, more specifically, to such apparatus which facilitates the removal and replacement of the filter without disturbing the framework.

Heretofore, in industries requiring large filtering apparatus, for example, in the mining industry and in various chemical industries, filter cloths and bags have been disposed over the framework of the filter mechanism to which pressure or vacuum has been applied, as has been necessary in the particular case. After filter cake has built up on the surface of the filter cloth or bag, the operation was discontinued while the filter cloth was removed. The filter cloth or bag was then replaced and the mechanism was then again connected to the pressure or vacuum apparatus so that the operation could be continued. With such apparatus the removal and replacement of the filter cloth or bag has proved time-consuming and inefficient and it has been desirable to provide a filtering apparatus which is less time-consuming and more efficient.

A primary object of the present invention is to provide new and improved filtering apparatus. In this connection, it is an object to provide such apparatus adaptable for use, for example, in the mining industry and in various chemical industries wherein pressure or vacuum is applied to the filter mechanism as is necessary in each particular case. A more specific object is to provide new and improved filtering apparatus which facilitates the removal and replacement of the filter without disturbing the framework of the apparatus.

A general object of the invention is to provide new and improved filtering apparatus characterized in its economy and efficiency and further characterized in that the removal and replacement of the filter is less time-consuming than in present conventional apparatus of this type.

In an exemplary form of the invention, a frame member is provided which forms a chamber having at least one opening formed therein and which is adapted to receive filter panels for closing the chamber. Additionally, means are provided for cooperating with the frame to retain the filter panels in place on the frame, the retaining means being readily removable so that the filter panels may readily be removed and replaced. A plurality of such filtering apparatus may be connected in contiguous relationship about the periphery of a shaft for rotational movement therewith so that a composite filtering system is provided.

Other objects and advantages of the invention will become apparent upon reading the attached detailed description taken in connection with the drawings wherein:

FIGURE 1 is a fragmentary side elevational view of a composite filtering system employing filtering apparatus constructed in accordance with the teachings of the present invention;

FIG. 2 is a cross-sectional view taken along lines 2—2 in FIG. 1;

FIG. 3 is a cross-sectional view taken along line 3—3 in FIG. 1;

FIG. 4 is a side elevational view of filtering apparatus constructed in accordance with the present invention wherein a filter panel is disclosed in the partially removed position; and FIG. 5 discloses the components which make up a filter panel for use with the filtering apparatus of the present invention.

While the invention has been shown and will be described in some detail with reference to a particular, exemplary embodiment thereof, there is no intention that it be limited to such detail. Quite to the contrary, it is intended here to embrace all modifications, alternatives and equivalents falling within the spirit and scope of the invention as defined by the appended claims.

Referring now to the drawings, a filtering apparatus 10 is shown which is constructed in accordance with the teachings of the present invention. While in the exemplary arrangement, the filtering apparatus 10 is shown as being substantially trapezoidal in shape and as forming a segment of a circle, it will be appreciated that the filtering apparatus may take various other shapes, such as the shapes of plates, discs, drums, etc., without departing from the spirit and scope of the present invention.

In accordance with the present invention, the filtering apparatus 10 includes a frame member 11 which defines an open ended chamber 12. More specifically, the exemplary frame member 11 is substantially in the form of a trapezoid and thus has four side walls 11a–11d. The frame member may be constructed of any desired material, such as 16 gauge sheet steel. The lower side wall 11c terminates in a header or plenum chamber 13 from which a duct or tube 14 extends. The duct or tube 14 is, in turn, adapted to be connected to a desired vacuum system (not shown) so that a desired fluid may be drawn through the filtering apparatus. As may be seen by reference to FIG. 1, a plurality of the filtering apparatus 10 may be mounted for rotational movement about a shaft 15 so that the filtering apparatus may be selectively rotated into and out of a filter solution. It will be readily apparent that the duct 14 of each filtering apparatus may be suitably secured to the shaft 15 and that the shaft 15 may be designed so that the duct 14 communicates with the vacuum system through the shaft.

In keeping with the present invention, the frame member 11 is adapted to receive filter panels 18 for closing the open ends of the chamber 12 defined by the frame member. More specifically, the side walls 11b–11d of the frame member are provided with winged channels 19a and 19b at the extremities thereof which are adapted to slidably receive the sides of filter panels 18, see FIG. 2. As may be seen, the filter panels 18 have substantially trapezoidal shapes corresponding to the shapes of the substantially trapezoidal open ends of the frame member 11.

For the purpose of retaining the filter panels in place on the frame member 11, a pair of susbtantially S shaped retainer members 20a and 20b are provided which are adapted to be suitably secured to opposite sides of the upper side wall 11a of the frame member for cooperating with the upper side wall to define channels which receive the tops of the filter panels 18 and thereby retain the filter panels in place on the frame member, see FIG. 3. The retainer members may likewise be constructed of any desired material, such as 16 gauge sheet steel. Suitable means 21 are provided for securing the retainer members 20a and 20b to the upper side wall 11a and such means may take the form of any desired fastener, such as a bayonet-type fastener or a latch having a screw head. Preferably, the fastening means are adapted to readily release the retainer members 20a and 20b so that the retainer members may be readily removed to facilitate removal and replacement of the filter panels 18.

In a typical operation wherein the filter panels 18 are to be removed, the fastening means 21 are operated to release the retainer members 20a and 20b and the retainer members are then removed. Thereafter, the filter panels are slid upwardly as shown in FIG. 4, out of the winged channels 19a and 19b defined by the frame member side walls. When the filter panels 18 have been removed, new filter panels 18 are slid downwardly into the winged channels 19a and 19b (see FIG. 4) until they are in the positions shown in FIG. 1. The retainer members 20a and 20b are then placed in position on the upper side wall 11a of the frame member and the fastening means 21 are operated to secure the retainer members to the upper wall whereby the filter panels 18 are retained in place on the frame member. Thus, it will be readily apparent that the present invention facilitates the removal and replacement of the filter panels 18.

As shown in FIG. 5, each filter panel 18 includes a filter supporting member 18a and a filter member 18b which are adapted to overlie one another to form the filter panel. The filter supporting member 18a is preferably constructed of a substantially rigid or stiff material, such as Masonite or paperboard, and is perforated to allow for the passage of fluid therethrough. On the other hand, the filter member 18b is preferably constructed of a pliable mesh material, such as mesh cloth or paper, which may be disposed of subsequent to use thereof. Thus, in the preferable form of the filter panel 18, the filter member 18b is adapted to be disposed of subsequent to the removal of a panel from the frame member so that a new filter member may be placed in overlying relationship on the supporting member 18a to form a new filter panel which may be moved into place on the frame member.

I claim as my invention:

1. In filtering apparatus, the combination comprising a polygonal-shaped frame having a plurality of connected side wall members forming an opening, each side wall member having an upper and a lower channel formed therein at the extremities thereof, a pair of polygonal-shaped filter panels conforming in configuration to said frame, one filter panel slidably disposed within the upper channel and the other filter panel slidably disposed within the lower channel of the side wall members, said filter panels being spaced apart to form a chamber, and a retainer means for retaining the filter panels in place comprising a substantially U-shaped side wall member connected to the first-mentioned side walls and forming part of the polygonal shaped frame, a pair of substantially S-shaped retainer members removably secured by a fastening means to each leg of said U-shaped side wall member and defining a securing channel between each said leg and a portion of the S-shaped retainer, said securing channel receiving an outer edge of the filter panel so that a filter panel may be removel by disengaging the fastening means and sliding the filter panel out of the channels of the side wall members.

2. The invention according to claim 1 wherein the filter panel comprises a perforated filter support member and a filter positioned thereon in overlying relationship.

3. In filtering apparatus, the combination comprising a plurality of polygonal-shaped frames mounted in contiguous realtionship on a shaft for rotational movement therewith, each polygonal-shaped frame having a plurality of connected side wall members forming an opening, each side wall member having an upper and a lower channel formed therein at the extremities thereof, a pair of polygonal-shaped filter panels conforming in configuration to said frame, one filter panel slidably disposed within the upper channel and the other filter panel slidably disposed within the lower channel of the side wall members, said filter panels being spaced apart to form a chamber, and an individual, retainer means for retaining the filter panels in place in each frame comprising a substantially U-shaped side wall member connected to the first-mentioned side walls and forming part of the polygonal shaped frame, a pair of substantially S-shaped retainer members removably secured by a fastening means to each leg of said U-shaped side wall member and defining a securing channel between each said leg and a portion of the S-shaped retainer, said securing channel receiving an outer edge of the filter panel so that a filter panel may be removed by disengaging the fastening means and sliding the filter panel out of the channels of the side wall members.

References Cited

UNITED STATES PATENTS

| | | | |
|---|---|---|---|
| 1,446,448 | 2/1923 | Brown | 210—331 X |
| 1,538,980 | 5/1925 | Genter | 210—345 X |
| 1,812,725 | 6/1931 | Stanley et al. | 210—486 X |
| 2,894,632 | 7/1959 | Myers | 210—331 |
| 2,964,194 | 12/1960 | Oliver et al. | 210—347 X |
| 3,283,906 | 11/1966 | Crane et al. | 210—331 X |

REUBEN FRIEDMAN, *Primary Examiner.*

C. DITLOW, *Assistant Examiner.*